United States Patent [19]

Johnson

[11] 4,361,889
[45] Nov. 30, 1982

[54] GRATING TUNED UNSTABLE RESONATOR LASER CAVITY

[75] Inventor: Larry C. Johnson, Princeton, N.J.

[73] Assignee: The United States of America as represented by the United States Department of Energy, Washington, D.C.

[21] Appl. No.: 175,815

[22] Filed: Aug. 6, 1980

[51] Int. Cl.³ .......................................... H01S 3/086
[52] U.S. Cl. .................................. 372/95; 372/102; 372/20
[58] Field of Search .................... 331/94.5 C; 356/350

[56] References Cited

U.S. PATENT DOCUMENTS 3,691,477  9/1972  Janney .......................... 331/94.5 C
3,928,817  12/1975  Chodzko ....................... 331/94.5 C

OTHER PUBLICATIONS

Deka et al., High-Power Tuned TEA $CO_2$ Laser Using a Three-Mirror Confocal Unstable Resonator, Appl. Optics, vol. 18, No. 22, (Nov. 15, 1979), pp. 3722-3724.

Siegman, Unstable Optical Resonators, Appl. Optics, vol. 13, No. 2, (Feb. 1974), pp. 353-367.

Primary Examiner—William L. Sikes
Assistant Examiner—Leon Scott, Jr.

[57] ABSTRACT

An unstable resonator to be used in high power, narrow line $CO_2$ pump lasers comprises an array of four reflectors in a ring configuration wherein spherical and planar wavefronts are separated from each other along separate optical paths and only the planar wavefronts are impinged on a plane grating for line tuning. The reflector array comprises a concave mirror for reflecting incident spherical waves as plane waves along an output axis to form an output beam. A plane grating on the output axis is oriented to reflect a portion of the output beam off axis onto a planar relay mirror spaced apart from the output axis in proximity to the concave mirror. The relay mirror reflects plane waves from the grating to impinge on a convex expanding mirror spaced apart from the output axis in proximity to the grating. The expanding mirror reflects the incident planar waves as spherical waves to illuminate the concave mirror. Tuning is provided by rotating the plane grating about an axis normal to the output axis.

8 Claims, 1 Drawing Figure

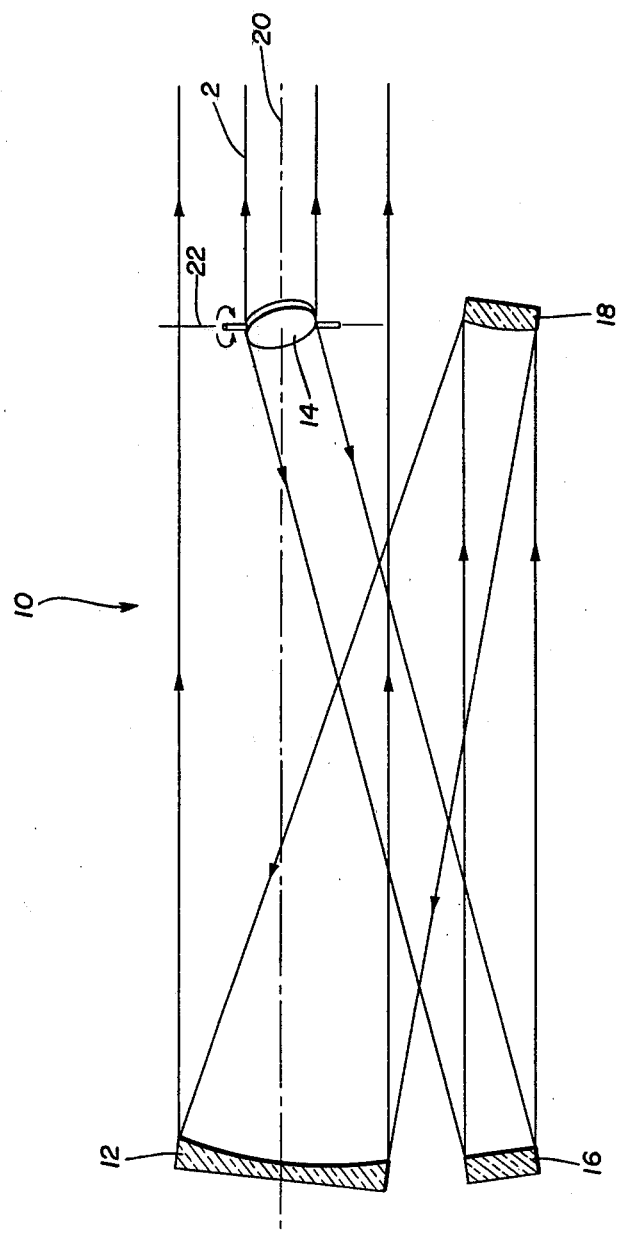

GRATING TUNED UNSTABLE RESONATOR LASER CAVITY

The United States Government has rights in this invention pursuant to Contract Number EY-76C-02-3073 between the U.S. Department of Energy and Princeton University (41 CFR S9-9.109-6(i) (5) (ii) (B)).

TECHNICAL FIELD

The present invention relates generally to unstable resonators used for extracting high power pulses from narrow line $CO_2$ pump lasers and more particularly to a method of and system for direct line tuning of such unstable resonators.

BACKGROUND ART

In recent years, interest has grown in the development of intense sources of far infrared (FIR) laser radiation for applications such as plasma diagnostics based on collective scattering of radiation by electron density fluctuations in plasmas of long Debye length. See, for example, D. E. Evans et al., "Far Infrared Superradiant Laser Action in a Methyl Fluoride", *Applied Physics Letters*, Volume 26, Number 11, June 1, 1975, at page 630, and D. E. Evans et al., "Far Infrared Super-radiant Laser Action in Heavy Water", *Optic Communications*, Volume 18, Number 4, September, 1976, at page 479.

Unstable resonators have been used for several years as a means of extracting high power, low divergence pulses from lasers with large Fresnel numbers. A detailed discussion of the characteristics of unstable optical resonators is given in Siegman, a.e., *Applied Optics*, Volume 13, Number 2, February, 1974, beginning on page 353, and a more general discussion is provided in Siegman, a.e., *An Introduction to Lasers and Masers*, McGraw Hill Book Company, 1971, at pages 342 and 343.

The conventional stable resonator, whose mirror configuration corresponds to a stable periodic focusing system, has a long slender Gussian profile lowest order mode whose diameter is on the order of a few times $(L\lambda)^{\frac{1}{2}}$, where L is the cavity length and $\lambda$ is the wavelength, which is generally less than the diameter of the laser mirrors themselves. If the diameter of the laser medium or tube is $2a$, where a is the maximum transverse beam diameter, then the area ratio of the laser medium cross section to the lowest mode cross section is of the same order as the Fresnel number $N_F = (a^2)/(L\lambda)$ characterizing the laser medium. If this Fresnel number is much larger than unity, the lowest order mode will extract only a fraction (about $(1)/(N_F)$) of the energy available in the laser medium. The laser must thus oscillate in a sizeable number of the higher order modes to extract all the energy from the laser medium.

The lowest order mode in the unstable resonator, by contrast, since the unstable resonator corresponds to a divergent periodic focusing system, expands on repeated bounces to fill the entire cross section of at least one of the laser mirrors, however, large it may be. The laser output is taken as a diffraction coupled beam passing around rather than through the output mirror. A more detailed discussion concerning the differences between stable and unstable optical resonators is given in the Siegman text, supra, at Chapter 8.

Unstable resonators have not yet been widely used as pump lasers for far infrared systems because the intermixing of spherical and plane wavefronts makes them difficult to tune. One approach that has been taken to tune an unstable resonator is to inject the beam from a grating tuned CW laser to seed the oscillation on the desired wavelength, using an intracavity absorption cell where necessary to suppress unwanted strong transitions. See, for example, D. P. Hutchinson et al., *Applied Optics*, Volume 16, page 293 (1977). A more direct tuning technique is required, however, if weaker lines are to be made accessible while retaining the large mode volume and excellent transverse mode discrimination possible with unstable resonators.

One object of the present invention, therefore, is to provide a new and improved method of and system for narrow line tuning of a high power $CO_2$ pump laser.

Another object is to provide a new and improved unstable resonator that is narrow line, grating tuned.

Another object is to provide an unstable resonator that is directly tunable to weak lines while retaining large mode volume and high quality transverse mode discrimination.

Another object is to provide a grating tuned unstable resonator that has reduced sensitivity to extracavity feedback normally associated with unstable resonators.

Additional objects, advantages and novel features of the invention will be set forth in part in the description which follows, and in part will become apparent to those skilled in the art upon examination of the following or may be learned by practice of the invention. The objects and advantages of the invention may be realized and obtained by means of the instrumentalities and combinations particularly pointed out in the appended claims.

DISCLOSURE OF INVENTION

To achieve the foregoing and other objects and in accordance with the purpose of the present invention, as embodied and broadly described herein, the unstable resonator of this invention may comprise an array of reflectors arranged in a ring configuration to establish separate optical paths for spherical and plane wavefronts, respectively. The array may include a concave reflector for reflecting incident spherical waves as plane waves along an output axis as an output beam and a plane grating on the output axis. The grating is oriented to reflect a portion of the output beam off axis toward a planar relay reflector spaced from the output axis and in proximity to the concave reflector. The relay reflector reflects plane waves from the grating to impinge on a convex reflector spaced from the output axis and positioned in proximity to the grating. The convex reflector expands the plane waves from the relay reflector as spherical waves to illuminate the concave reflector. Line tuning of the resonator is provided by rotating the plane grating about an axis normal to the output axis of the resonator.

Thus, line tuning of the unstable resonator is simplified since the plane grating is exposed only to plane waves, spherical waves being restricted to the portion of the cavity between the convex and concave reflectors. The grating may have a much smaller diameter than the diameter of the concave mirror since the grating reflects only feedback waves. Further, since the system has a ring laser cavity architecture, the extreme sensitivity to extracavity feedback normally associated with unstable resonators is avoided.

A three mirror confocal unstable resonator that permits line tuning of a high powered TEA $CO_2$ laser using a plane blazed grating is disclosed in Deka et al., "High Power Tuned TEA CO$_2$ Laser Using a Three Mirror Confocal Unstable Resonator", *Applied Optics*, Volume 18, Number 22, November 15, 1979, at page 3722. In that system, however, the plane grating is double passed using a divergent beam from a convex mirror. The convex mirror tilts the beam off axis to the grating which then returns the beam to the convex mirror that in turn returns the beam to the concave mirror. In that double pass process, a large portion of the beam coming off the grating is wasted since it expands around a small mirror. Since the convex mirror is used at a rather acute angle with respect to normal incidence, spherical aberrations tend to be created. Furthermore, the arrangement of reflectors in the article is not in ring architecture so that the resonator would tend to be sensitive to extracavity feedback.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The accompanying drawing, which is incorporated in and forms a part of the specification, illustrates a preferred embodiment of the invention, and, together with the description, serves to explain the principles of this invention.

The FIGURE is a schematic view showing a line tuned unstable resonator configuration in accordance with the invention.

BEST MODE FOR CARRYING OUT THE INVENTION

Referring to the FIGURE, an unstable resonator 10, in accordance with the invention, comprises a reflector array including a large concave, collimating mirror 12, a plane grating 14, a planar relay mirror 16 and a convex, expanding mirror 18 all arranged in a ring configuration. The collimating mirror 12 is oriented on output axis 20 and directs planar waves parallel to the output axis 20 forming an output beam. The plane grating 14, which is formed with vertical grooves, is rotatable about a vertical axis 22 (normal to output axis 20). The grating 14 is located on or near the output axis and positioned to reflect planar waves off axis, as shown, to impinge on the surface of relay mirror 16. The relay mirror 16 is spaced apart from the output axis 20 and is in proximity to collimating mirror 12. The relay mirror 16 is oriented to reflect planar waves from grating 14 to impinge on the surface of convex mirror 18. The convex mirror 18 is also spaced apart from the output axis 20 and is in proximity to plane grating 14.

It is apparent that the rays travelling between relay mirror 16 and expanding mirror 18 as well as between plane grating 14 and the relay mirror are planar and that the output beam is also planar whereas the waves travelling between expanding mirror 18 and collimating mirror 12 are spherical. In other words, only the optical path established between the convex and concave mirrors 18, 12 contains spherical wavefronts. The configuration shown in the FIGURE thus separates the spherical and planar wavefront into different optical paths and exposes the grating 14 to only planar waves to enable direct line tuning. Since only a portion of the output beam on axis 20 is fed back to the cavity by grating 14, the grating may be of relatively small diameter, i.e., less than that of concave mirror 12.

The spectral resolution of the cavity shown in the FIGURE may be obtained from a ray tracing analysis in a conventional manner. The result is:

$$\Delta\lambda/\lambda = \frac{(M-1)^2}{M(3M+1)} \frac{a}{2L} \cot \arcsin \frac{\lambda}{2d},$$

where
- $\lambda$ is the central wavelength,
- d is the grating spacing,
- a is the radius of the grating (used in first order),
- L is the cavity length, and
- M is the geometric magnification.

Exemplary parametric values are a=2.5 cm, (1)/(d)=(135)/(mm), L=400 cm, and M=5 (i.e., a 25 cm diameter collimating mirror 12). Using these parameters, the equation predicts a resolution of 0.0072 $\mu$m at $\lambda$=9.26 $\mu$m, which is sufficient to obtain single line operation in the 9R branch of CO$_2$. With a laser comprised of two Lumonics Model 620 modules in the cavity (not shown) and with the laser tuned to the 9R(22) line and both units in operation, the system shown in the FIGURE has developed pulse energy within the range of 200–400 joules and is insensitive to trigger delays of up to 1 microsecond between the two modules. Furthermore, the ring architecture of the configuration shown in the FIGURE provides very low sensitivity to extracavity feedback.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein. For example, the distances between grating 14 and concave mirror 12 and between planar mirror 16 and convex mirror 18 may be varied, provided the distance between the concave and convex mirrors is unchanged. Also, the positions of the grating 14 and planar mirror 16 may be interchanged. Any of these modifications will, of course, tend to change the spectral resolution of the cavity.

I claim:

1. A tunable, unstable resonator laser cavity, comprising:
   a concave reflector for reflecting incident spherical electromagnetic waves as planar waves along an output axis to form an output beam;
   a plane grating on said output axis; having means for radjusting an orientation of said plane grating for line tuning of the cavity;
   a planar reflector located off said output axis and in proximity to said concave reflector; and
   a convex reflector located off said output axis and in proximity to said grating;
   said plane grating being positioned to reflect a portion of the plane electromagnetic waves of said output beam to impinge on said planar reflector;

said planar reflector being positioned to reflect incident plane electromagnetic waves as plane waves to impinge on said convex reflector; and said convex mirror being positioned to reflect incident plane electromagnetic waves as spherical waves to impinge on said concave reflector.

2. A tunable, unstable resonator laser cavity, comprising an array of reflectors arranged in a ring configuration to establish separate optical paths for spherical and plane wavefronts, said array including a concave reflector for reflecting incident spherical electromagnetic waves as plane waves along an output axis to form an output beam, a plane grating on said output axis having means for adjusting an orientation of said plane grating for line tuning of the cavity and oriented to reflect a portion of said output beam off axis; a planar relay reflector spaced from said output axis and in proximity to said concave reflector for reflecting plane electromagnetic waves from said grating; and a convex reflector spaced from said output axis and in proximity to said grating for reflecting plane electromagnetic waves from said relay reflector as spherical electromagnetic waves to illuminate the concavereflector.

3. The cavity of claim 1 or claim 2, wherein said concave reflector, said convex reflector and said planar reflector are totally reflecting mirrors.

4. The cavity of claim 1 or claim 2, including means for rotating said grating about an axis normal to the output axis for tuning said cavity.

5. The cavity of claim 1 or claim 2 wherein the diameter of said grating is less than the diameter of said concave reflector.

6. A method of tuning an unstable resonator laser cavity within which are propagated by reflector means intermixed spherial and plane electromagnetic waves, comprising the steps of separating said spherical and plane electromagnetic waves from each other within said cavity; impinging only said plane electromagnetic waves on to a plane grating within said cavity and controlling an orientation of said grating to cause said cavity to oscillate at a predetermined frequency.

7. The method of claim 6, wherein said separating step includes the steps of establishing first and second optical paths for said spherical and plane waves, respectively, within said cavity and positioning said plane grating in only said second optical path.

8. A tunable, unstable resonator laser cavity, comprising an array of reflectors within said cavity arranged in a ring configuration to establish separate optical paths for spherical and plane wavefronts, said array including first reflector means for establishing a first optical path containing substantially only spherical wavefronts and second reflector means for establishing a second optical path containing substantially only plane wavefronts, and a plane grating positioned in said second optical path having means for adjusting an orientation of said plane grating for line tuning of the cavity.

* * * * *